United States Patent
Kuroda et al.

[19]
[11] Patent Number: 6,132,843
[45] Date of Patent: Oct. 17, 2000

[54] GLASS SUBSTRATE FOR MAGNETIC DISKS

[75] Inventors: Yasunao Kuroda; Yoshihiro Matsuno; Shinya Katayama; Akihiro Koyama; Jyunji Kurachi, all of Osaka, Japan

[73] Assignee: Nippon Sheet Glass Do., Ltd., Osaka, Japan

[*] Notice: This patent is subject to a terminal disclaimer.

[21] Appl. No.: 08/969,474

[22] Filed: Nov. 13, 1997

[30] Foreign Application Priority Data

Nov. 14, 1996 [JP] Japan ................................. 8-303205

[51] Int. Cl.[7] .................. C02C 3/087; G11B 5/84; G11B 5/74; G11B 5/82

[52] U.S. Cl. .............. 428/141; 428/410; 428/338; 428/220; 428/64.1; 428/64.2; 428/64.3; 428/64.4; 428/65.3; 428/694 SG; 428/694 TR; 428/694 ST; 501/68; 501/69; 501/70; 369/280; 360/135; 346/137

[58] Field of Search ............... 428/410, 653, 428/141, 338, 220, 64.1, 64.2, 64.3, 64.4, 65.3, 694 SG, 694 TR, 694 ST; 369/280; 360/135; 346/137; 501/68, 69, 70

[56] References Cited

U.S. PATENT DOCUMENTS

| | | | |
|---|---|---|---|
| 4,833,001 | 5/1989 | Kijima et al. | 428/141 |
| 5,062,021 | 10/1991 | Ranjan et al. | 360/135 |
| 5,087,481 | 2/1992 | Chen et al. | 427/129 |
| 5,108,781 | 4/1992 | Ranjan et al. | 427/53.1 |
| 5,273,834 | 12/1993 | Hoover et al. | 428/694 |
| 5,586,040 | 12/1996 | Baumgart et al. | 364/474.08 |
| 5,681,636 | 10/1997 | Marshall | 428/65.3 |
| 5,691,256 | 11/1997 | Taguchi et al. | 501/63 |
| 5,846,628 | 12/1998 | Kuroe et al. | 428/65.3 |
| 5,902,665 | 5/1999 | Kuroda | 428/141 |

FOREIGN PATENT DOCUMENTS

| | | |
|---|---|---|
| 2-128318 | 5/1990 | Japan . |
| 3-73419 | 3/1991 | Japan . |
| 4-311814 | 11/1992 | Japan . |
| 6-290452 | 10/1994 | Japan . |
| 7-182655 | 7/1995 | Japan . |

OTHER PUBLICATIONS

"Contact Start/Stop Characteristics on Photolithographic Magnetic Recording Media", H. Ishihara et al., "Wear", vol. 172, 1994, p. 65 (Abstract and Introduction only).

*Primary Examiner*—Ellis Robinson
*Assistant Examiner*—Laura L. Lee
*Attorney, Agent, or Firm*—Vidas, Arrett & Steinkraus, P.A.

[57] ABSTRACT

A glass substrate for a magnetic disk of the present invention is one in which a laser beam is irradiated on a main surface thereby forming a large number of protrusions thereon to form texture thereon, each of said protrusions being formed by a protruded portion having a convex shape, said glass having a composition in which 0.2 to 3 wt % of an oxide of a transition metal is contained and an absorption coefficient with respect to a wavelength of a light at 266 nm being within a range of 0.03 to 2 $\mu m^{-1}$, and by setting the absorption coefficient of the glass with respect to a wavelength of a light at 266 nm within a range of 0.03 to 2 $\mu m^{-1}$ and irradiating a laser beam having a wavelength in a range of ultraviolet rays selectively on the main surface of a glass substrate at predetermined intervals, texture comprising a large number of protrusions formed by protruded portions each having a small diameter and a convex shape is formed.

12 Claims, 7 Drawing Sheets

GLASS SUBSTRATE FOR MAGNETIC DISKS

BACKGROUND OF THE INVENTION

1. Field of the Invention

This invention relates to a glass substrate for a magnetic disk. More specifically, this invention relates to a glass substrate of this kind which has a predetermined composition and is formed with protrusions on a surface thereof by irradiating a laser beam on the surface to form texture.

2. Prior Art

A fixed magnetic disk unit employs a mechanism called a CSS (Contact Start Stop) system in which a magnetic head is in contact with a disk surface when the disk is stationary and is brought into sliding contact with the same when the disk is started and stopped.

In the CSS system, to prevent stiction from occurring when the disk is started and stopped as well as to reduce friction which will occur on such occasions, so-called texture, i.e. a suitably finely-roughened surface formed by protruded portions and recessed portions (which may be formed by protruded portions alone) is provided on the disk. The texture is provided on all or part of a main surface of the disk. Assuming that the texture is formed merely on part (CSS zone) of the main surface, the magnetic head is moved to the CSS zone at proper timing when the disk is brought into a CSS operation. Further, when the power is turned off during rotation of the disk, the magnetic head is also moved to the CSS zone.

Particularly, when the texture is formed on part of the main surface, the remaining part can preserve smoothness similar to that of a mirror surface, which enables the magnetic head to be floated at a lower position. Therefore, the partially-formed texture is suitable for increasing the recording density (packing density) of the magnetic disk unit.

For a substrate of this disk, an aluminum (Al)-magnesium (Mg) alloy substrate plated with nickel (Ni)-phosphorus (P), i.e. a so-called aluminum substrate, has been widely employed. To provide texture on the aluminum substrate, a method of forming concentric scratches on the substrate by using an abrasive tape has been widely in practice. However, this method is difficult to meet the requirements of prevention of stiction and reduction of friction at the same time when a further lower floating position is demanded of the magnetic head.

To solve this problem, U.S. Pat. Nos. 5,062,021 and 5,108,781, for instance, disclose a process of forming pits comprised of recesses and annular protrusions surrounding the recesses on a surface of a metal of an aluminum substrate by using a Nd:YAG laser so as to reduce stiction. The above US patents merely relate to texture processing of an aluminum substrate.

On the other hand, as a method for forming texture on a glass substrate having excellent smoothness by abrasion, rigidity and impact resistance as compared with an aluminum substrate, there have been known A. a method of subjecting a glass to dry etching by using the photolithographic method ((1) Noboru Kawai et al., Japan Lubrication Society, Draft Collection of Tribology Meeting at Fukuoka, (October 1991) p. 265, (2) H. Tanaka et al., "IEEE Transactions on Magnetics" vol. 29, No. 1 (January 1993) p. 270, (3) H. Ishihara et al., "Wear" vol. 172 (1994) p. 65), B. a method of chemically etching a glass substrate (Japanese Laid-Open Patent Publication (Kokai) No. 3-245322), C. a method of dispersing fine particles on a glass substrate (Japanese Laid-Open Patent Publication (Kokai) No. 2-128318) and D. a method of utilizing an island-like structure by sputtering (Japanese Laid-Open Patent Publication (Kokai) No. 3-73419).

The above Method A has a characteristic that the shape or the like of texture can be controlled precisely, but the cost is high. Methods B, C and D are advantageous in the point of the cost, but they have problems that stability at the time of manufacture is slightly poor and it is difficult to form texture merely on a CSS region.

To solve the above problems, as a method for forming texture on a glass substrate, a method of using irradiation of a laser beam has recently been proposed (Japanese Laid-Open Patent Publications (Kokai) Nos. 4-311814, 7-182655 and 6-290452).

In Japanese Laid-Open Patent Publication (Kokai) No. 7-182655, it is merely described that a laser beam is employed which has a certain range of an optical transmittance of a laser beam energy pulse against the glass, but there is no description concerning the relation of the laser beam with a glass composition. Further, as to a laser beam wavelength, only a value of 10.6 $\mu$m is disclosed, but no other wavelength is mentioned.

It is known that in general, in a texture part of the magnetic disk, so long as a ratio of an area of protruded portions of the texture to a total area of the surface of the magnetic disk is identical, protrusions of the texture each having a smaller diameter, i.e. protrusions of the texture with smaller space intervals are more suitable for a lubricant to take effect, thereby improving abrasion resistance of the magnetic disk ((1) Hiroshi Tani et al., Japan Tribology Society, Draft Collection of Tribology Meeting at Kanazawa, October 1994, p. 153, (2) H. Ishihara et al., "Wear", vol. 172 (1994) p. 65). Therefore, it is preferred that each protrusion of the texture has a smaller diameter than one disclosed in an example of a smaller diameter of texture is desired from the example of Japanese Laid-Open Patent Publication (Kokai) No. 7-182655 (in which each protrusion of texture has a diameter of 30 $\mu$m).

SUMMARY OF THE INVENTION

An object of the present invention is to provide a glass substrate for a magnetic disk which has a predetermined composition and is formed with protrusions on a surface thereof by irradiating a laser beam on the surface to form texture.

Another object of the present invention is to provide a glass substrate for a magnetic disk, in which desired protrusions can be formed on the surface of the glass substrate with accuracy and efficiently based on a glass composition, the absorption coefficient of a glass and the intensity of a laser beam.

The glass substrate for a magnetic disk of the present invention is a glass substrate for a magnetic disk in which a laser beam is irradiated on a main surface thereby forming a large number of protrusions thereon to form texture thereon, each of said protrusions being formed by a protruded portion having a convex shape, said glass having a composition in which 0.2 to 3 wt % of an oxide of a transition metal is contained and an absorption coefficient with respect to a wavelength of a light at 266 nm being within a range of 0.03 to 2 $\mu m^{-1}$.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Now, preferred embodiments of the invention will be described in detail.

As generally known, when the diameter of a laser beam is reduced by using the same lens, a spot diameter becomes smaller as the wavelength of the laser beam is smaller. As a means for changing the wavelength of the laser beam, there have been known devices such as an SHG (Secondary Harmonic Generation) element and an FHG (Fourth Harmonic Generation) element. By using such a device, ½ or ¼ of the original wavelength of the laser beam can be obtained. SHG refers to a phenomenon that a certain substance absorbs a light having a certain frequency and emits a light having a frequency which is twice the original frequency (Secondary Harmonic Generation). At the time of SHG, the wavelength becomes ½. FHG refers to fourth harmonic generation, and the wavelength becomes ¼.

Particularly when a laser beam having a wavelength in a range of ultraviolet rays is used, the spot diameter of the laser beam can be reduced easily in texture processing by irradiation of a laser beam, and texture having a considerably small diameter can be formed easily on a glass substrate.

The present inventors have made the wavelength of a YAG laser beam which is an easily obtainable laser beam with a high output power shorter by FHG and intensely carried out experiments of texture processing on glass substrates having various compositions. As a result, they have found that stable texture processing can be carried out only on a glass containing a specific amount or more of a specific transition metal oxide.

The reason will be described below. A glass containing the above specific transition metal oxide has a large absorption coefficient of a light in a range of ultraviolet rays, and an irradiated laser beam is efficiently absorbed in the outermost surface e.g. up to a depth of 50 $\mu m$ of the glass. Therefore, when a laser beam is irradiated on a glass substrate, the outermost surface of the glass is heated locally and rapidly, and the temperature thereof reaches a softening and fluidizing temperature region. When the energy density of the irradiated laser beam is suitable, an irradiated portion is softened and protruded accompanied with thermal expansion without gasification and evaporation to form protrusions each formed by a protruded portion having a convex shape. Thereafter, when irradiation of the laser beam is stopped, that portion is rapidly cooled, and by such cooling, the above protruded portions are shrinked, but protrusions having a perdetermined size are left. As a result, the protruded portions each having a shape protruded from the original surface of the substrate are left. Therefore, these protrusions can be used as texture in a magnetic disk.

Here, change in density of a glass subjected to common heat treatment will be described.

Change in density of a glass caused by heat treatment is understood as described below.

Figure 3:
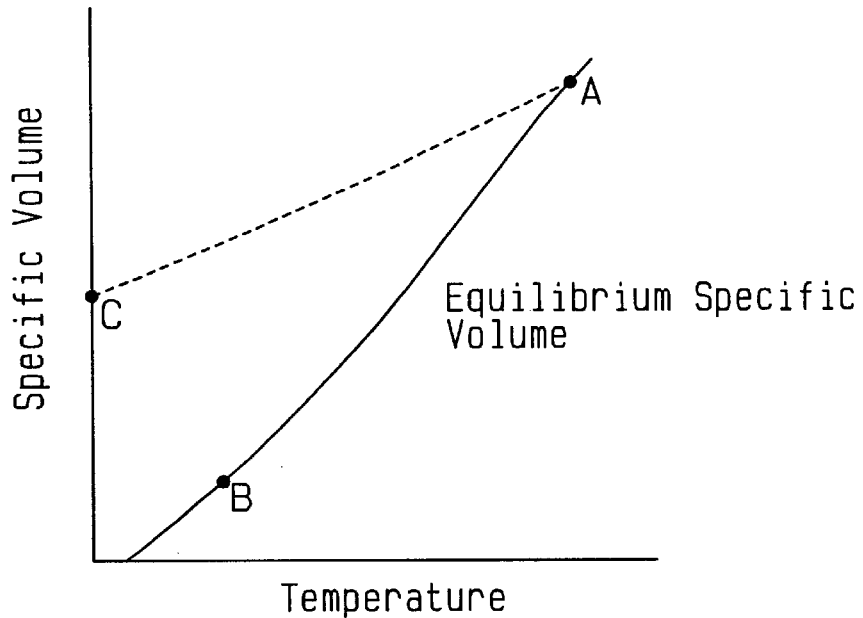
FIG. 3 is a graph showing a relation between the specific volume of a general glass and the temperature of the glass.

(1) When a certain temperature is retained, the structure of a glass reaches an equilibrium state. In FIG. 3, a relation between the specific volume of the glass and the temperature thereof is shown. The specific volume and temperature of the glass in an equilibrium state are positioned on a line A–B in the figure.

(2) When the glass is heated quickly or cooled quickly, its specific volume is changed in parallel with a line A–C in the figure.

(3) When the glass is retained at a certain temperature for a sufficiently long time, its specific volume is moved closely to the line A–B in the figure.

(4) When the glass is retained at a certain temperature, the rate of change in specific volume is proportional to a difference of a specific volume in an equilibrium state.

When the case of irradiating a laser beam described above is considered, the portion on which the laser beam has been irradiated is heated quickly and cooled quickly to increase the specific volume of that portion. That is, the volume of the portion is expanded, and the expanded volume is fixed.

Further, when the surface of the above substrate has stress of compression by chemical reinforcement or the like, the protruded portions each having a largely convex shape can be obtained.

That is, a laser beam having a wavelength in a range of ultraviolet rays is selectively irradiated at a plurality of positions at predetermined intervals on a main surface of a glass substrate in which a glass has a composition in which 0.2 to 3 wt % of an oxide of a transition metal is contained and an absorption coefficient with respect to a wavelength of a light at 266 nm (nanometer) being 0.03 $\mu m^{-1}$ or more. The main surface of the glass refers to a surface of a glass substrate with not only a mangetic recording portion but also texture being formed thereon. On the main surface of the glass substrate in a target region at each of the above positions at predetermined intervals, a protruded portion having a convex shape is formed to form texture thereon.

As the above laser beam having a wavelength in a range of ultraviolet rays, one obtained by a ¼ wavelength conversion of a laser beam generated by a YAG laser is preferably used, since it is possible to easily obtain a high output power, a laser beam-generating device is relatively inexpensive, and so forth.

As the above oxide of a transition metal, titanium oxide, vanadium oxide, chromium oxide, manganese oxide, iron oxide, cobalt oxide, nickel oxide, copper oxide, molybdenum oxide, tungsten oxide, cerium oxide and so forth are preferably used. These transition metal oxides are relatively inexpensive and can be easily contained in a glass. These transition metal oxides can be used singly or as a complex of two or more of them. Among these transition metal oxides, iron oxide, copper oxide, nickel oxide, titanium oxide or cerium oxide is preferably used since it has low toxicity. Among these transition metal oxides, iron oxide, copper oxide, titanium oxide or cerium oxide is more preferred since desired protrusions can be formed more securely on the main surface of the substrate by using a laser beam. Iron oxide is most preferably used since it is inexpensive.

When these transition metal oxides exist in the glass, d electrons in the transition metal atoms thereof are transited between allowable energies to effect coloring, thereby absorbing ultraviolet rays efficiently. As a metal to be added for coloring the glass, there may be mentioned, for example, a transition metal such as Ti, V, Cr, Mn, Fe, Co, Ni, Cu, Mo, W and Ce, and a rare earth element such as Nd, Pr, Er and Ho.

The content of these transition metal oxides is required to be 0.2% or more from a viewpoint of texture processing property and is required to be 3 wt % or lower from viewpoints of the uniformity of the composition in the glass, the melting temperature of the glass and other thermal characteristics. The content of the transition metal oxides is preferably within a range of 0.2 to 2 wt %, more preferably 0.5 to 2 wt % from viewpoints of these characteristics and cost.

To form desired protrusions as texture on the main surface of the glass substrate, an absorption of a light having a wavelength in a range of ultraviolet rays is required to be excellent. The absorption coefficient of the glass in the present invention is required to be within a range of 0.03 to 2 $\mu m^{-1}$, preferably within a range of 0.05 to 1 $\mu m^{-1}$, more preferably within a range of 0.1 to 0.3 $\mu m^{-1}$. Texture having a uniform protruded shape can be formed so long as the absorption coefficient of the above glass e.g. with respect to a light having a wavelength at 266 nm is 0.03 $\mu m^{-1}$ or more. To enable a lower output power of a laser beam to be used, the absorption coefficient is preferably 0.05 $\mu m^{-1}$ or more, more preferably 0.1 $\mu m^{-1}$ or more. However, if the absorption coefficient is too large, glass components are evaporated or the glass is broken. Therefore, the absorption coefficient is required to be 2 $\mu m^{-1}$ or less, preferably 1 $\mu m^{-1}$ or less, more preferably 0.3 $\mu m^{-1}$ or less.

Figure 4:
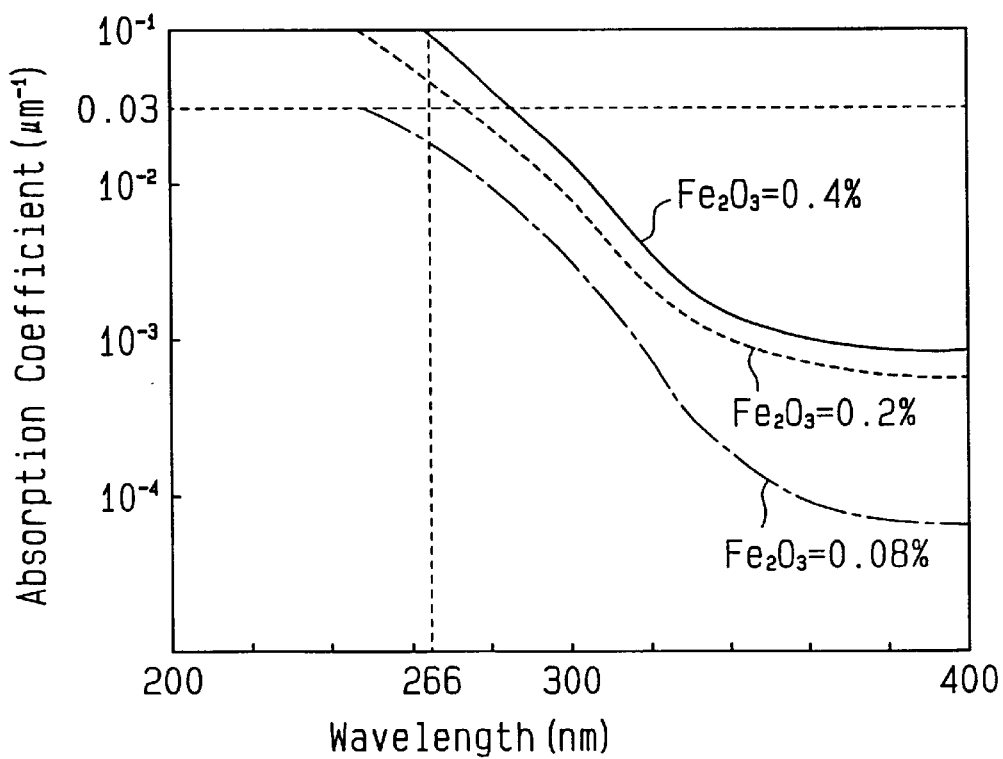
FIG. 4 is a graph showing a relation between the absorption coefficient of a glass and the wavelength of a light.

As one example, change in absorption coefficient in the case of changing the content of iron oxide in a soda lime glass composition is shown in FIG. 4. In the figure, a solid line shows a case where the content of iron oxide is 0.4 wt %, a broken line shows a case where it is 0.2 wt %, and an alternate long and short dash line shows a case where it is 0.08 wt %. In the case where the content of iron oxide is 0.08 wt %, since the content is small, the absorption coefficient with respect to ultraviolet rays having a wavelength at 266 nm is about 0.02 $\mu m^{-1}$. To the contrary, the absorption coefficients in the cases where the content of iron oxide is 0.2 wt % and 0.4 wt %, respectively, are 0.03 $\mu m^{-1}$ or more.

Figure 5:
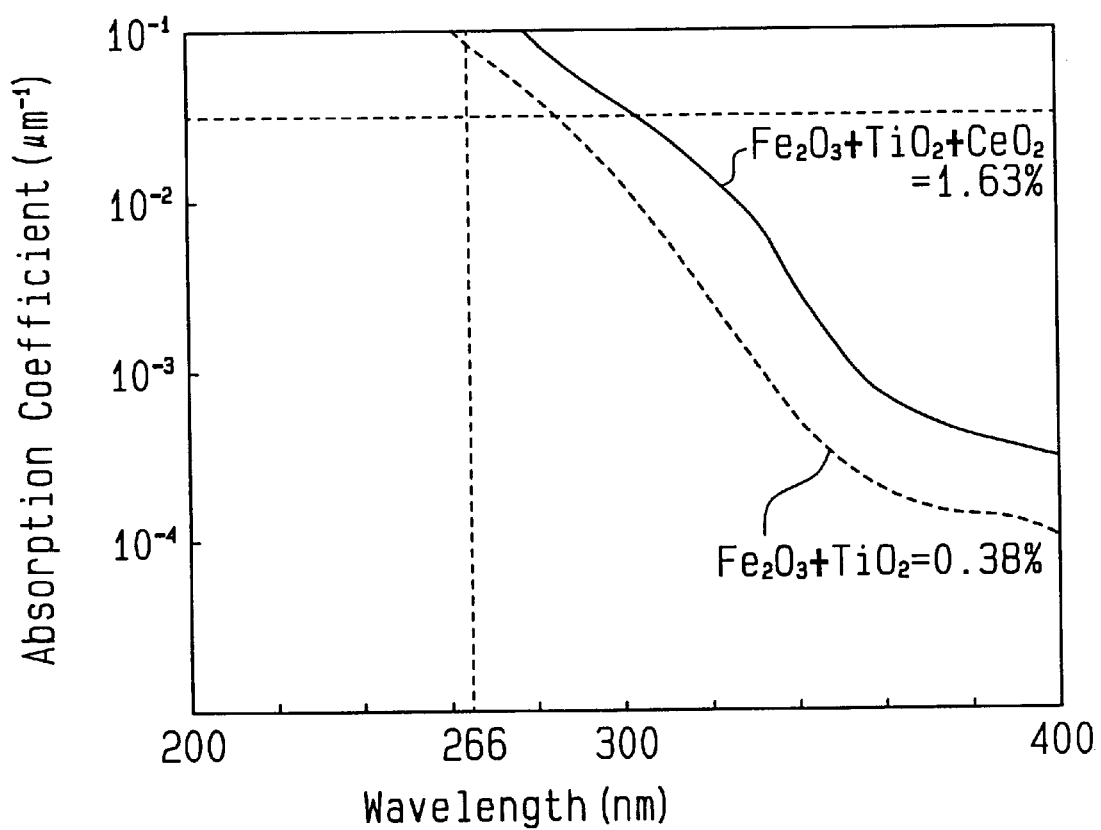
FIG. 5 is a graph also showing a relation between the absorption coefficient of a glass and the wavelength of a light.

As another example, changes in absorption coefficient in the case of containing iron oxide and titanium oxide ($Fe_2O_3$: 0.36%, $TiO_2$: 0.02%, total: 0.38%, a broken line in the figure) in a soda lime glass composition and in the case of containing iron oxide, titanium oxide and cerium oxide ($Fe_2O_3$: 0.84%, $TiO_2$: 0.23%, $CeO_2$: 0.56%, total: 1.63%, a solid line in the figure) therein are shown in FIG. 5. In either of the cases, since 0.2 wt % of transition metal oxides are contained, the respective absorption coefficients are also 0.03 $\mu m^{-1}$ or more.

As a basic composition of the above glass substrate, a soda lime silicate glass which has been widely used as a glass for a car and so forth and can be manufactured inexpensively, or an aluminosilicate glass or borosilicate glass having excellent weather resistance is preferably used.

As a soda lime silicate glass which can be used in the present invention, there may be mentioned, for example, a glass having a composition in which 70 to 74 wt % of silicon oxide is contained as a main component and 0 to 2.5 wt % of aluminum oxide, 0.1 to 1.2 wt % of iron oxide, 0 to 0.3 wt % of titanium oxide, 3.0 to 4.5 wt % of magnesium oxide, 6.5 to 9.5 wt % of calcium oxide, 12 to 14 wt % of sodium oxide, 0 to 1.2 wt % of potassium oxide and 0 to 1 wt % of cerium oxide are contained (provided that the total amount of iron oxide, titanium oxide and cerium oxide is 0.2 wt % or more).

In such a soda lime silicate glass, if the content of silicon oxide is lower than 70 wt %, the strength and chemical endurance of the glass are degraded, whereas if the same exceeds 74 wt %, it is difficult to melt the glass. If the content of aluminum oxide exceeds 2.5 wt %, it is difficult to melt the glass. In general, since 0.1% or so of iron oxide is contained as impurity, if the content of iron oxide is made lower than 0.1 wt %, the cost is increased, whereas if the same exceeds 1.2 wt %, the glass is liable to be crystallized. If the content of titanium oxide exceeds 0.3 wt %, the cost is increased. If the content of magnesium oxide is lower than 3 wt %, it is difficult to melt the glass and also the glass is liable to be crystallized, whereas if the same exceeds 4.5 wt %, the glass is also liable to be crystallized. If the content of sodium oxide is lower than 12 wt %, it is difficult to melt the glass, whereas if the same exceeds 14 wt %, chemical endurance is degraded. If the content of potassium oxide exceeds 1.2 wt %, it is difficult to melt the glass and also the cost is increased. If the content of cerium oxide exceeds 1 wt %, the cost is increased.

It is preferred that the above glass substrate is chemically reinforced so as to ensure a strength satisfying the requirement of a substrate for a magnetic disk as well as to form each protrusion into a largely convex shape.

The chemical reinforcing treatment is carried out by immersing the glass within a molten salt containing monovalent metal ions having a larger ion radius than monovalent metal ions contained in the composition of the glass, thereby causing the ion exchange to be effected between the metal ions within the glass and the metal ions within the molten salt. Sodium ions in the vicinity of the surface of the glass substrate are replaced with potassium ions having a larger ion radius than the sodium ions. The resulting stress of compression acts to reinforce the surface of the glass substrate. Further, the glass substrate may be immersed within, for example, a mixed molten salt of silver nitrate (0.5 to 3 wt %) and potassium nitrate (97 to 99.5 wt %) for 30 minutes to one hour. This causes the silver to quickly permeate into the surface of the glass substrate, thereby promoting the reinforcement of the surface of the glass substrate.

The above texture formed by convex-shaped protrusions may be formed on all over the main surface of the glass substrate, but it may be partially formed in a predetermined radius range of the main surface. By partially forming protrusions on the main surface, it is possible to maintain a disk surface similar to that of a mirror surface in a radius range other than texture-processed areas, which enables a magnetic head to be floated at a lower position when the disk head is made a magnetic disk medium, and hence such partial texture is suitably used for the magnetic disk.

The texture shape is formed of substantially regularly arranged protruded portions each having a convex shape substantially circular in plane view. The protruded portions each having a convex shape are preferably spaced by a range of 1 to 100 $\mu$m. If the spacing of the protruded portions is smaller than 1 $\mu$m, it takes a long time period to process texture, which results in low productivity. On the other hand, if the spacing of the same exceeds 100 $\mu$m, the CSS characteristics are degraded. The spacing is more preferably within a range of 2 to 50 $\mu$m.

It is preferred that the protrusions each have a height within a range of 5 to 100 nm. If the height is smaller than 5 nm, when the glass substrate is formed into a recording medium, adhesion of the magnetic head to the magnetic medium increases. On the other hand, if the height exceeds 100 nm, when the same is formed into a recording medium, the magnetic head cannot be floated in a sufficiently low position. The height of each protrusion is more preferably within a range of 10 to 50 nm.

It is preferred that the diameter of each convex-shaped protruded portion forming the texture is within a range of 1 to 20 $\mu$m. If the diameter of the convex-shaped protruded portion is smaller than 1 $\mu$m, it is difficult to form uniform texture in a stable manner. On the other hand, if the diameter of the protruded portion exceeds 20 $\mu$m, the CSS characteristics are degraded. From viewpoints of the characteristics and productivity, the diameter of each protruded portion is more preferably within a range of 1 to 10 $\mu$m.

A magnetic disk medium can be obtained by providing a substrate layer, a magnetic medium layer and a protective layer one upon another on the glass substrate on which texture described above is formed.

A magnetic disk medium is also obtained by providing a substrate layer for enhancing magnetic characteristics, a magnetic medium layer and a protective layer one upon another on the the main surface of the glass substrate and further providing a lubricating layer on the protective layer. For the purposes of further enhancing the magnetic characteristics, increasing an adhesive force, etc., additional intermediate layers nay be formed between the substrate layer and the glass substrate.

Next, the composition of the aluminosilicate glass constituting the glass substrate for a magnetic disk of the present invention will be described.

The composition in terms of weight of the aluminosilicate glass is: 58 to 66% of silicon oxide ($SiO_2$), 13 to 19% of aluminum oxide ($Al_2O_3$), 3 to 4.5% of lithium oxide ($Li_2O$), 6 to 13% of sodium oxide ($Na_2O$), 3 to 4.5% of potassium oxide ($K_2O$), and 10 to 18% of $R_2O$ (provided that $R_2O = Li_2O + Na_2O + K_2O$), further, 0 to 3.5% or magnesium oxide (MgO), 1 to 7% of calcium oxide (CaO), 0 to 2% of strontium oxide (SrO), 0 to 2% of barium oxide (BaO), and 2 to 10% of RO (provided that RO=MgO+CaO+SrO+BaO); and optionally, 0 to 2% of titanium oxide ($TiO_2$), 0 to 2% of cerium oxide ($CeO_2$), 0 to 2%; of iron oxide ($Fe_2O_3$), and 0 to 1% of manganese oxide (MnO), provided that $TiO_2 + CeO_2 + Fe_2O_3 + MnO = 0.01$ to 3%.

The aluminosilicate glass having such a composition can be manufactured by a floating method, and is low in 2melting temperature, excellent in water resistance and weather resistance after a chemical reinforcing treatment, and further has an expansion coefficient which permits the glass to be used in combination with a metal product. The floating method is a method of causing a molten glass to flow into a high-temperature bath which holds molten tin therein and has an upper space filled with a reducing atmosphere, from one end thereof, and pulling the glass from another end of the bath to expand the glass into a plate shape. According to the floating method, a glass plate can be obtained which has opposite surfaces parallel to each other without any distortion but with surface gloss, and it is possible to carry out mass production of the glass plate. Further, the inner portion of the glass plate has less residual stress, and when a glass disk substrate is manufactured by using the glass plate, handling thereof can be facilitated, for example, less cracking of the substrate during polishing occurs.

It is further preferred that the composition in terms of weight the aluminosilicate glass is: 60 to 66% of $SiO_2$, 15 to 18% of $Al_2O_3$, 3 to 4.5% of $Li_2O$, 7.5 to 12.5% of $Na_2O$, and 0 to 2% of $K_2O$ (provided that $Li_2O + Na_2O + K_2O$ 11 to 17%);

further, 0.5 to 3% of MgO, 2.5 to 6% of CaO, 0 to 29, of SrO, and 0 to 2% of BaO (provided that MgO+CaO+SrO+BaO=3 to 9%); and optionally, 0 to 2% of $TiO_2$, 0 to 2% of $CeO_2$, 0 to 2% of $Fe_2O_3$, and 0 to 1% of MnO (provided that $Fe_2O_3 + TiO_2 + CeO_2 \geqq 0.2\%$).

In the above composition of the aluminosilicate glass, $SiO_2$ is a main component essential to the glass. If the content of $SiO_2$ is lower than 58 wt %, water resistance of the glass exhibited after ion exchange is degraded, whereas if the same exceeds 66 wt %, viscosity of molten glass becomes too high so that it is difficult to carry out melting and shaping of the glass, and the glass has an excessively low expansion coefficient.

$Al_2O_3$ is a component necessary for increasing an ion exchange rate, and improving the water resistance exhibited after the ion exchange. If the content of $Al_2O_3$ is lower than 13 wt %, the effects cannot be obtained sufficiently, whereas if the same exceeds 19 wt %, the viscosity of the molten glass becomes too high so that it is difficult to carry out melting and shaping of the glass, and the glass has an excessively low expansion coefficient.

$Li_2O$ is a component essential to carry out the ion exchange, and effective for increasing solubility of the glass. If the content of $Li_2O$ is lower than 3 wt %, a sufficient stress of surface compression cannot be obtained after the ion exchange, and the solubility of the glass is low, whereas if the same exceeds 4.5 wt %, the water resistance exhibited after the ion exchange is degraded, and a liquid-phase temperature of the glass becomes higher, which makes it difficult to carry out the shaping of the glass.

$Na_2O$ is a component for increasing the solubility of the glass. If the content of $Na_2O$ is lower than 6 wt %, effects thereof are insufficient, whereas if the same exceeds 13 wt %, the water resistance of the glass after the ion exchange is degraded.

$K_2O$ is a component for increasing the solubility of the glass. However, this component is not essential because the stress of surface compression of the glass after the ion exchange is lowered. Therefore, it is preferred that the content thereof is 5 wt % or lower.

Further, if the sum of the content of $Li_2O+Na_2O+K_2O$ is lower than 9 wt %, the viscosity of molten glass becomes so high that it is difficult to carry out melting and shaping of the glass, and the glass has an excessively low expansion coefficient, whereas if the same exceeds 18 wt %, the water resistance of the glass exhibited after the ion exchange is degraded.

MgO is a component for increasing the solubility of the composition, and if the content thereof exceeds 3.5 wt %, the liquid-phase temperature of the glass becomes so high that it is difficult to effect shaping of the glass.

CaO is a component for increasing the solubility of the glass and an essential component for adjusting the ion exchange rate. If the content of CaO is lower than 1 wt %, effects thereof are not sufficient, whereas if the same exceeds 7 wt %, the liquid-phase temperature of the glass becomes so high that it is difficult to effect shaping of the glass.

SrO and BaO are components for increasing the solubility and at the same time effective for lowering the liquid-phase temperature of the composition. If the content of these components exceeds 2 wt %, the density of the glass becomes high and the manufacturing costs thereof become high.

Further, if the content of the sum MgO+CaO+SrO+BaO is lower than 2 wt %, the viscosity of molten glass becomes so high that it becomes difficult to melt and shape the glass, whereas if the same exceeds 10 wt %, the liquid-phase temperature becomes so high that it is difficult to shape the glass.

In a molten glass, $Fe^{2+}$ and $Fe^{3+}$ of $Fe_2O_3$ are in an equilibrium state, and the transmittance of a light through molten glass, especially, the transmittance of the light in an infrared region is largely dependent on these ions. If the content of $Fe_2O_3$ exceeds 2 wt %, the absorption in the infrared region becomes too high, which makes it impossible to control the temperature distribution of the glass when it is melted and shaped, resulting in degraded quality of the glass.

$TiO_2$, $CeO_2$, and MnO are components effective for changing the equilibrium state of $Fe^{2+}$ and $Fe^{3+}$ to thereby change the transmittance of a light by mutual interaction. When the content of $TiO_2$ exceeds 3 wt %, or if the content of $CeO_2$ and that of MnO each exceed 1 wt %, the quality of a glass material is degraded and manufacturing costs of the glass are increased.

$SO_3$ is derived from a sulfate to be used as a refining aid. When the sulfate is used as a refining aid, if its residual amount in the glass is lower than 0.05 wt %, a refining effect is not sufficient. On the other hand, if the residual amount exceeds 0.5 wt %, the refining effect is not improved, and $SO_3$ contained in an exhaust gas at the time of melting the glass is increased, which is not preferred from a viewpoint of environment. Therefore, the amount of $SO_3$ remaining in the glass is preferably within a range of 0.05 to 0.5 wt %.

The content of $As_2O_3$ and that of $Sb_2O_3$ which are generally used as a refining aid are preferably 1 wt % or lower because of their toxicities, more preferably an amount migrated from impurities or lower, i.e. 0.1 wt % or lower.

In the glass having the composition described above, the average coefficient of linear thermal expansion exhibited within a temperature range of 50 to 350° C. is preferably larger than $8.0 \times 10^{-6}$/K, more preferably larger than $8.4 \times 10^{-6}$/K.

The above aluminosilicate glass may or may not contain zirconium oxide ($ZrO_2$). Although the content of $ZrO_2$ is largely dependent on the composition of the glass, the content thereof is desirably within a range of 0 to 7 wt %. If the glass does not contain $ZrO_2$, it is possible to set the melting temperature (at which a viscosity of $10^2$ poise is exhibited) of the glass composition to 1550° C. or lower, and set the working temperature (at which a viscosity of $10^4$ poise is exhibited) of the glass composition to 1100° C. or lower, with the liquid-phase temperature being equal to or lower than the working temperature. Further, it is preferred that the melting temperature (at which the viscosity of $10^2$ poise is exhibited) of the glass composition is set to 1540° C. or lower, and the working temperature (at which the viscosity of $10^4$ poise is exhibited) of the glass composition is set to 1055° C. or lower, with the liquid-phase temperature being the working temperature or lower. Under such conditions, it is possible to manufacture the glass substrate with ease by the floating method, and obtain a high-quality glass substrate having a high flatness.

It is preferred that the aluminosilicate glass is subjected to a chemical reinforcing treatment described for the soda lime silicate glass so as to maintain a strength satisfying the requirement of a substrate for a magnetic disk.

By irradiating a laser beam on a predetermined area of the surface of the aluminosilicate glass substrate having the composition described above, it is possible to form protruded portions each having a convex shape e.g. a mountain-like shape or a crator-like shape. When the protruded portions are formed, if the output power of the laser beam is low, as described below, influence of the output power of the laser beam on the height of the protruded portions is slight so that variation in the laser output causes little variation in height of protruded portions formed thereby. Therefore, it is preferred that protruded portions are formed under a condition of a low laser output power.

In the composition of the aluminosilicate glass, the height of the protruded portions has a relation with the content of an oxide of a transition metal e.g. iron oxide ($Fe_2O_3$) in the glass and the output power of the laser beam as shown below: Height of protruded portion=a×content of iron oxide×ln(output power of laser beam/b)

where a and b each represent a coefficient, the unit of the height of the protruded portions is nm, the unit of the content of iron oxide is wt %, ln represents a natural logarithm, and the unit of the output power of the laser beam is mW.

Further, in the composition of the glass, when the content of iron oxide is within a range of 0.4 to 0.6 wt %, the coefficient a is 3950, and the coefficient b is 45.4 to 45.9.

Based on the above relationship, the height of the protruded portions can be determined directly from the composition of the glass, i.e. the content of iron oxide and the output power of the laser beam.

The above relationship is also applied to copper oxide, titanium oxide, cerium oxide and so forth other than iron oxide.

Figure 8:
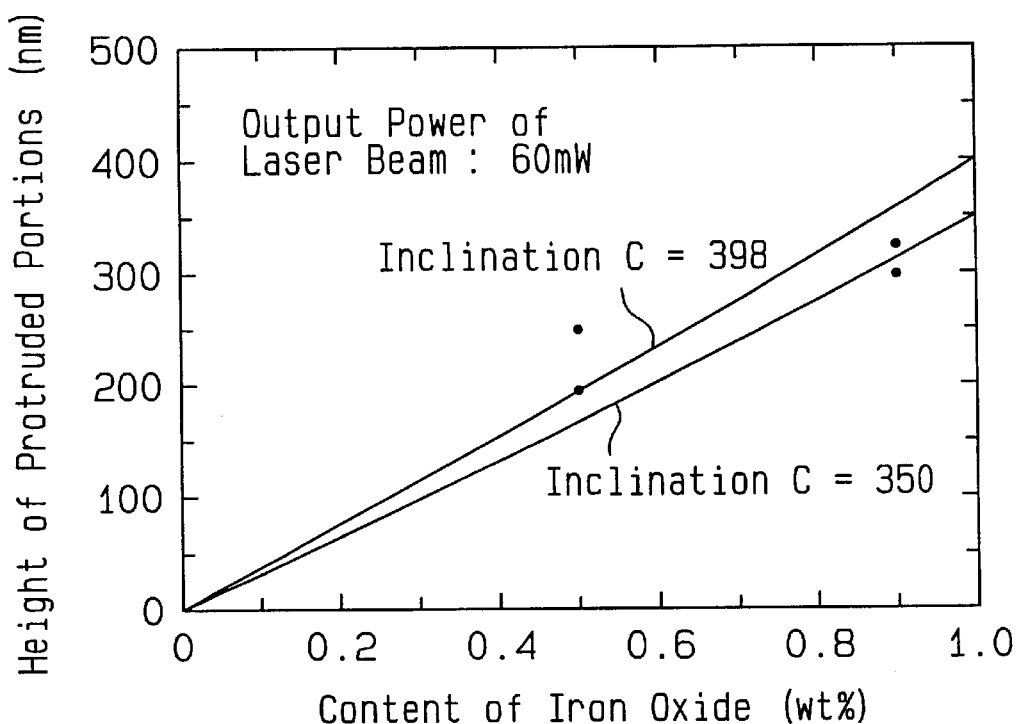
FIG. 8 is a graph showing a relation between the height of a protruded portion and the content of iron.
Figure 9:
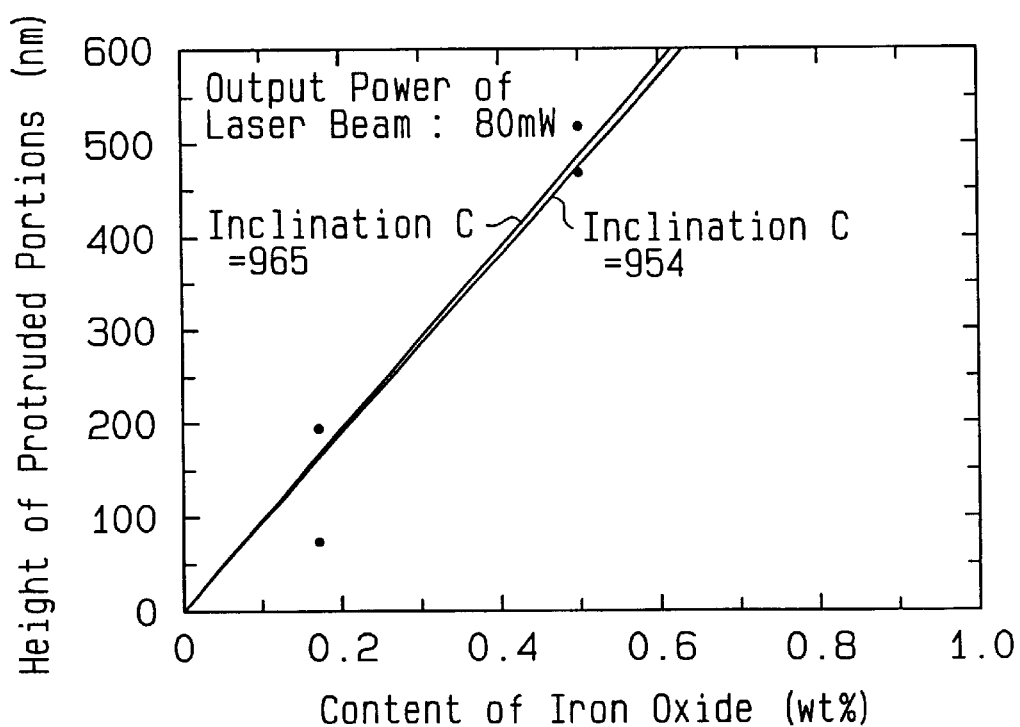
FIG. 9 is a graph showing a relation between the height of a protruded portion and the content of iron similarly as in FIG. 8.
Figure 10:
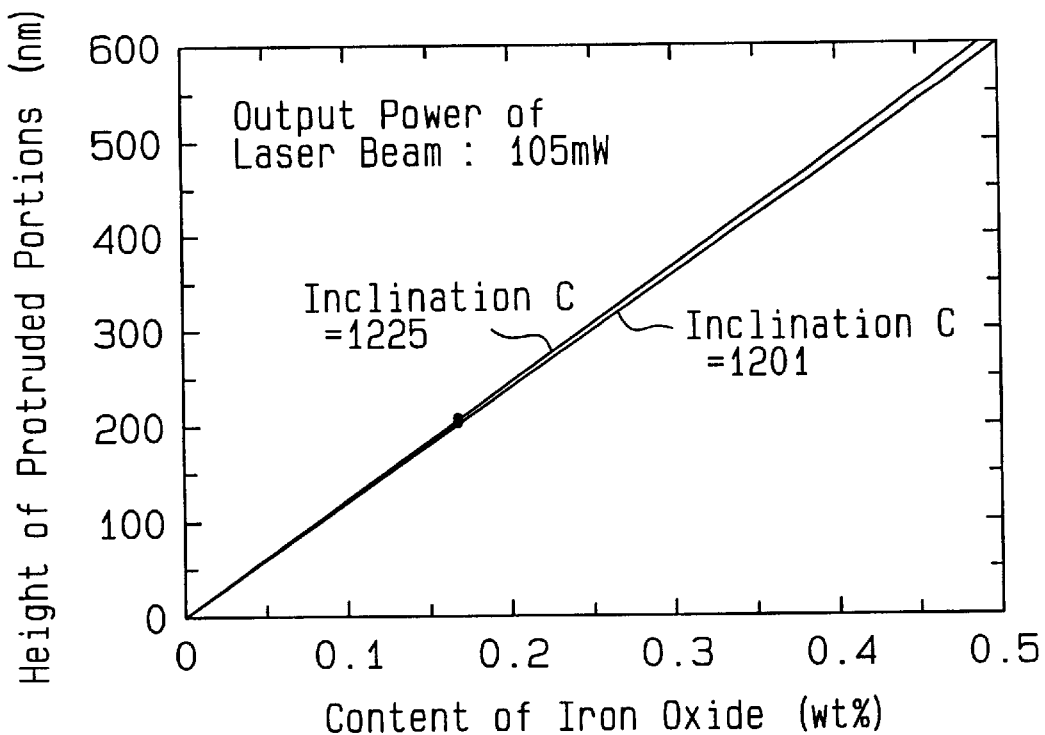
FIG. 10 is a graph showing a relation between the height of a protruded portion and the content of iron similarly as in FIG. 8.

By the above relationship, the range of the output power of the laser beam is expressed as shown below. b×exp[height of protruded portions/(a×content of oxide of transition metal)]>output power of laser beam>b The above relationship was deduced as described below. That is, a relation between the height of protrusions and the content of iron of each glass substrate having an iron oxide content of 0.17, 0.5 or 0.9 wt % was determined with respect to each case where the output power of a laser beam was 60, 80 or 105 mW under the optimum conditions and under the worst conditions. The results are shown in FIGS. 8 to 10. In each of FIGS. 8 to 10, a straight line shown at an upper side expressing the optimum conditions and a straight line shown at a lower side expressing the worst conditions were obtained, and it is considered that variation between the straight lines is caused. From the respective figures, the average inclination of the three lines in total can be obtained.

Figure 11:
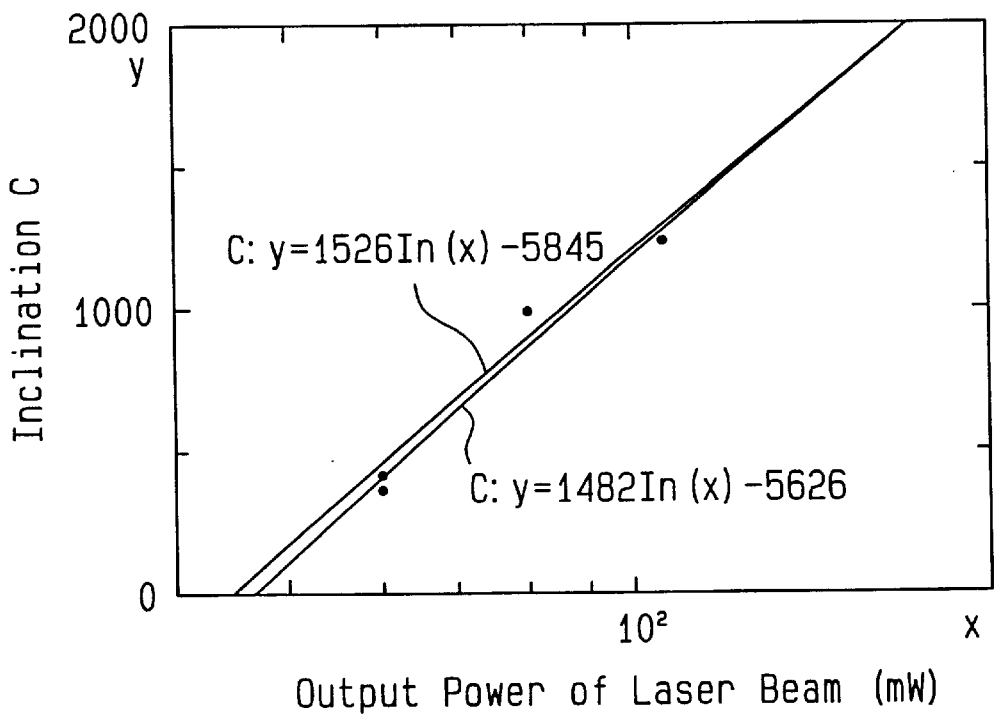
FIG. 11 is a graph showing a relation between the inclination of a straight line and the output power of a laser beam.

Next, a relation between the inclination of the straight line obtained from FIGS. 8 to 10 and the output power of the laser beam was determined and is shown in FIG. 11. As can be clearly seen from FIG. 11, there is a logarithmic relation between the output power of the laser beam and the inclination of the straight line.

Based on the above relation, the height of the protruded portions, the content of iron oxide and the output power of the laser beam have the following relationship:

Height of protruded portions

=c×content of iron oxide

=[a×ln(output power of laser beam)−d]×content of iron oxide

=a×content of iron oxide×ln(output power of laser beam/b)

where ln(b)=d/a, and c and d each represent a coefficient.

Figure 12:
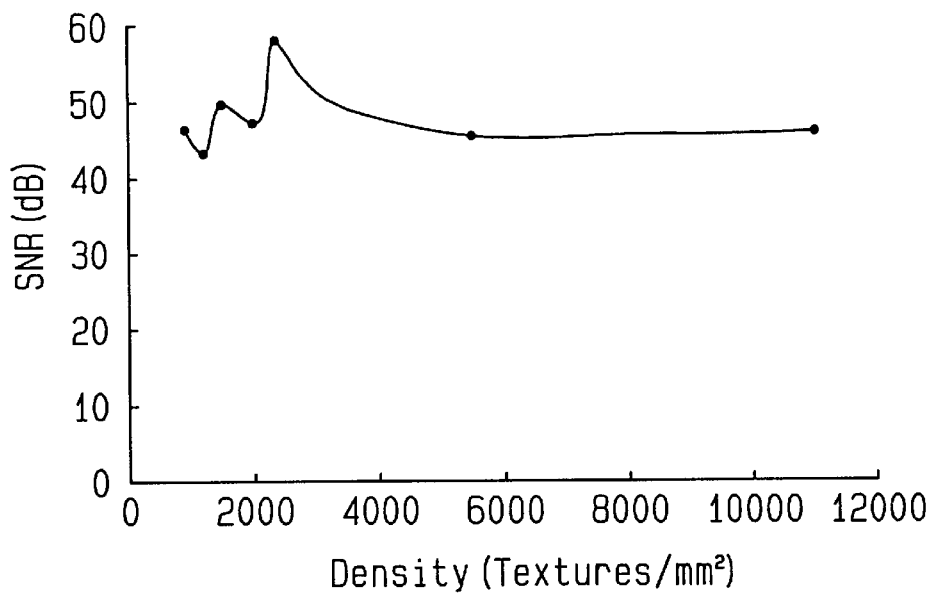
FIG. 12 is a view showing a relation between the density of texture and a SN ratio.

To confirm the appropriateness of the relationship, tests were carried out with respect to the cases of using iron oxide contents different from the above, i.e. 0.4 and 0.6 wt % and laser beam output powers different from the above, i.e. 46.2 and 51.0 mW. Measured values obtained are shown in FIG. 12. When the coefficients a and b were determined so that the height of the protruded portions with the output power of the laser beam being 46.2 mW corresponded to the measured value, a was 3950, and b was 45.4 to 45.9. The height of the protruded portions in the case where the output power of the laser beam was 51.0 mW was calculated by using the above values. As a result, as shown in FIG. 12, it can be seen that the calculated value quite coincide with the measured value.

The oxide of a transition metal in the glass and the absorption coefficient of the glass has a linear relation so that the following relationship is deduced from the above relationship:

Height of the protruded portions=a×(absorption coefficient of glass−e)×ln (output power of laser beam/b)

where a, b and e each represent a coefficient, the unit of the height of the protruded portions is nm, the unit of the absorption coefficient of the glass is $\mu m^{-1}$, ln represents a natural logarithm, and the unit of the output power of the laser beam is mW.

For example, when the oxide of a transition metal is iron oxide, a is 23200, b is 45.9, and e is 0.0014.

Therefore, by measuring the height of the protruded portions under conditions of a predetermined absorption coefficient and a predetermined laser beam output power and determining the respective coefficients a, b and e, the height of the protruded portions under conditions of other absorption coefficient and other laser beam output power can be calculated easily, which can facilitate design of texture.

As described above, according to the present embodiment, the following advantageous effects can be obtained:

(1) By irradiating a laser beam having a wavelength in a range of ultraviolet rays selectively on a predetermined area of a glass substrate, protrusions suitable as texture for a magnetic disk can be formed easily.

(2) By irradiating a predetermined laser beam on a glass substrate such as a soda lime silicate glass or an aluminosilicate glass, a large number of predetermined protruded portions are formed on the main surface of the glass substrate to obtain protrusions, thereby forming texture for a magnetic disk.

(3) In a predetermined composition of an aluminosilicate glass, the height of protruded portions has a constant relation with the content of an oxide of a transition metal e.g. iron oxide in the glass and the output power of a laser beam so that the height of the protruded portions can be calculated easily from the content of iron oxide and the output power of the laser beam. Thus, protrusions can be formed on the surface of a glass substrate for a magnetic disk with accuracy and efficiently. Therefore, texture can be designed with good efficiency.

(4) In a predetermined composition of an aluminosilicate glass, the absorption coefficient of the glass has a linear relation with the content of an oxide of a transition metal e.g. iron oxide in the glass so that the height of protruded portions can be calculated easily from the content of iron oxide and the output power of a laser beam.

Therefore, protrusions can be formed on the surface of a glass substrate for a magnetic disk with accuracy and efficiently, and texture can be designed with good efficiency.

(5) By subjecting the surface of a glass substrate to chemical enforcement, the glass substrate has a strength satisfying the requirement of a glass substrate for a magnetic disk, and each protrusion can be formed into a largely convex shape.

(6) By using a soda lime silicate glass as a glass for forming a glass substrate, manufacturing costs can be reduced. By using an aluminosilicate glass, weather resistance can be improved.

EXAMPLES

Now, the invention will be described in further detail based on examples. It should be noted that the invention is not limited to these examples.

Example 1

Glass slabs each having a glass composition in which iron oxide, titanium oxide and cerium oxide were incorporated into a soda lime silicate glass having a composition (wt %) shown in Table 1 so as to have contents (wt %) shown in Table 2 were prepared. After these slabs were processed to be formed into a columnar shape, the centers of the resulting columns were hollowed out and sliced to prepare glass substrates each having a disk shape. By lapping and then polishing the main surfaces of the glass substrates having a disk shape, smooth glass substrates each having a predetermined plate thickness were obtained. The glass substrates were subjected to a chemical reinforcing treatment and then washed. The outer diameter of each disk was made 65 mm, the inner diameter thereof as made 20 mm, and the plate thickness thereof was made 0.635 mm.

As comparative samples, a sample containing neither iron oxide, titanium oxide nor cerium oxide and a sample containing lower than 0.2 wt % of iron oxide are also shown in Table 2. The absorption coefficients of the comparative samples were 0.02 $\mu m^{-1}$ or lower, respectively.

TABLE 1

| Compositional component | wt % |
| --- | --- |
| $SiO_2$ | 71.3 |
| $Al_2O_3$ | 1.5 |

TABLE 1-continued

| Compositional component | wt % |
|---|---|
| MgO | 3.7 |
| CaO | 9.0 |
| Na$_2$O | 13.5 |
| K$_2$O | 1.0 |

TABLE 2

| Sample No. | Iron oxide | Titanium oxide | Cerium oxide | Absorption coefficient |
|---|---|---|---|---|
| 1 | 0.2 | — | — | 0.04 |
| 2 | 0.2 | 0.03 | — | 0.04 |
| 3 | 0.4 | 0.02 | — | 0.08 |
| 4 | 0.5 | — | — | 0.1 |
| Comparative sample 1 | — | — | — | >0.01 |
| Comparative sample 2 | 0.1 | — | — | 0.02 |

Figure 2:
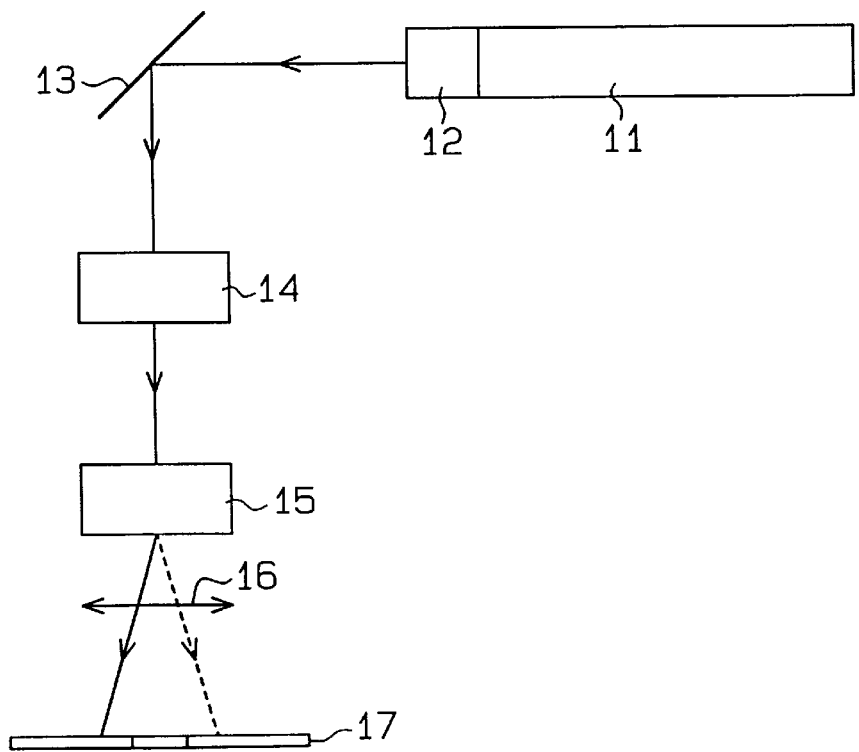
FIG. 2 is a conceptual view showing a constitution of a laser beam irradiating device.

*Absorption coefficient ($\mu m^{-1}$) with respect to a wavelength of a light at 266 nm The glass substrates after washing were subjected to texture processing by a device conceptually shown in FIG. 2. As a laser processing light source 11, a YAG pulsed laser was used. That is, a laser beam emitted from the light source 11 was converted to a light having a wavelength which was half the original wavelength by an SHG (Secondary Harmonic Generation) element 12 and then made incident upon an FHG (Fourth Harmonic Generation) element 14 by means of a fixed mirror 13. The laser beam was further converted into a light having a wavelength which was half the above wavelength by the FHG element 14. The resulting laser beam having a wavelength at 266 nm was focused at a predetermined position on the surface of a glass substrate 17 by means of a galvanomirror 15 and a condensing lens 16.

The power of the laser beam with a wavelength at 266 nm was changed from 50 mW to 10 mW, the intervals of pulses were made 0.2 m sec, the spot diameter of the laser beam was made 10 $\mu$m, and intervals between adjacent laser beam spot irradiation positions were made 25 $\mu$m. The laser beam was irradiated on texture-processed areas so that a disk radius was within a range of 13.0 mm to 16.0 mm and also protrusions were arranged in a lattice state.

After the above texture processing, the surfaces of the glass substrates were observed by a polarization microscope and ZYGO (trade name, available from Canon Sales Co.) to evaluate presence or absence of formation of protruded portions and shapes of the protruded portions.

Figure 6:
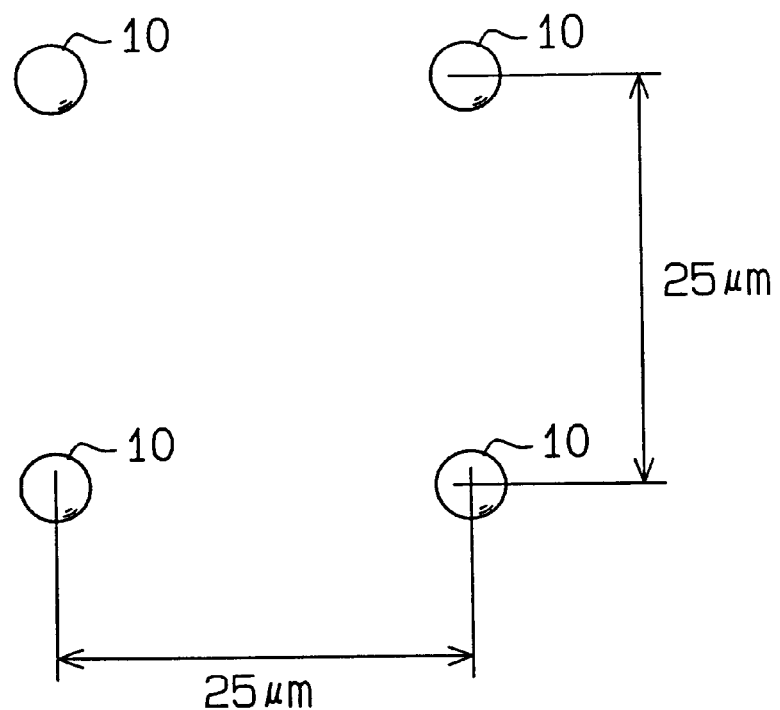
FIG. 6 is a partial plane view showing arrangement of protrusions on a glass substrate surface.

Firstly, no protruded portion was formed on the glass substrate containing no transition metal oxide and the glass substrate containing only 0.1 wt % of iron oxide. On the other hand, on the glass substrates containing 0.2 wt % or more in total of the transition metal oxide(s), protruded portions 10 were formed stably at intervals of 25 $\mu$m as shown in FIG. 6.

Further, the results of the protrusion shapes are shown in Table 3.

⊙ shows that annular protruded portions (see FIG. 7) are formed, ○ shows that protruded portions each having a convex shape are formed, and X shows that no protruded portion is formed.

TABLE 3

| | Laser beam power (mW) | | | | |
|---|---|---|---|---|---|
| Sample | 50 | 40 | 30 | 20 | 10 |
| 1 | ⊙ | ⊙ | ⊙ | X | X |
| 2 | ⊙ | ⊙ | ⊙ | ○ | X |
| 3 | ⊙ | ⊙ | ⊙ | ○ | ○ |
| 4 | ⊙ | ⊙ | ⊙ | ○ | ○ |

From these results, it can be seen that as the content of a transition metal oxide is increased, texture can be formed even with a lower laser power. It is considered that as the amount of the transition metal oxide is increased, the absorption coefficient of a glass with respect to a wavelength of a laser beam is increased so that the laser beam is absorbed more efficiently in the surface of the glass.

Figure 1:
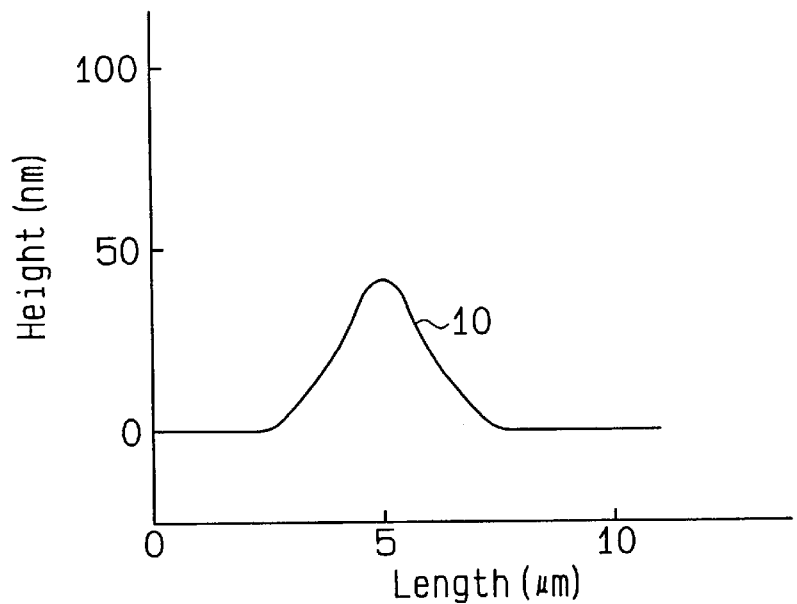
FIG. 1 is an explanatory view showing one example of a sectional shape of a protruded portion by irradiation of a laser beam.
Figure 7:
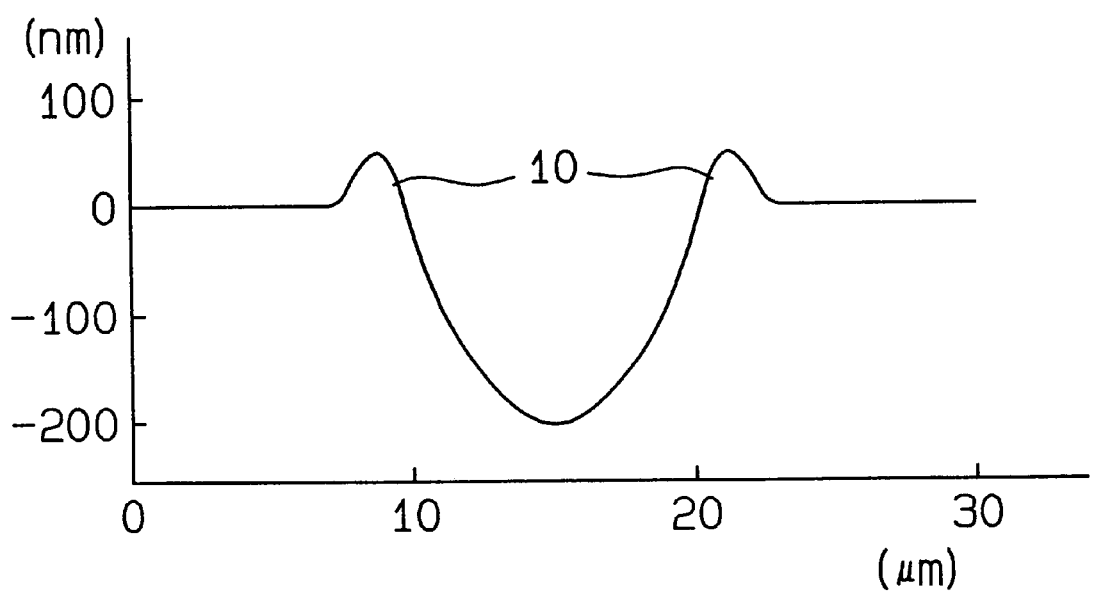
FIG. 7 is an explanatory view showing one example of a sectional shape of an annular protruded portion.

A point to which attention should be paid herein is that when a laser power is made smaller, the shape of texture is changed from the shape of the annular protruded portions 10 shown in FIG. 7 to the shape of the protruded portions 10 each having a convex shape and predetermined height and diameter shown in FIG. 1.

Among the above glass substrates, the glass substrate on which protruded portions each having a convex shape were formed was washed and then could be provided for forming a magnetic disk medium.

The glass substrate containing only 0.1 wt % of iron oxide (Comparative sample 2) was further subjected to texture processing with a laser beam power being increased to 75 mW. As a result, protruded portions were partially formed on the glass substrate, but no protruded portion was formed on most part thereof. The glass substrate was further subjected to texture processing with a laser beam power being increased to 100 mW. As a result, protruded portions were still partially formed on the glass substrate, the sizes and shapes of the protruded portions were not uniform, and the protruded portions were unsuitable as texture of a disk substrate.

It is considered as a reason therefor that in the above glass containing no transition metal oxide or containing an insufficient amount of the transition metal oxide, even if the irradiation power of a laser beam is increased, since an optical absorption coefficient in a range of ultraviolet rays is small, an irradiated laser beam is not absorbed efficiently in the outermost surface of the glass, but it is absorbed in an inner portion thereof so that protruded portions cannot be formed stably.

The upper limit of the content of the transition metal is 3 wt %. If the content thereof exceeds the upper limit, the cost is increased.

In Example 1, the glass disk substrates were processed by using the glass slabs as a starting material. With respect to glass disk substrates processed by using glass plates prepared by the floating method as a starting material, the same test results were obtained.

Example 2

A glass slab having a glass composition in which copper oxide was incorporated into an aluminosilicate glass having a composition (wt %) shown in Table 4 so as to have a content of copper oxide being 2 wt % was prepared. Subsequently, the same processing as in Example 1 was carried out to obtain a glass disk substrate.

TABLE 4

| Compositional component | wt % |
|---|---|
| $SiO_2$ | 64.0 |
| $Al_2O_3$ | 16.0 |
| $ZrO_2$ | 4.0 |
| $Li_2O$ | 7.0 |
| $Na_2O$ | 9.0 |

The glass disk substrate was subjected to texture processing under the same conditions as in Example 1. As a result, in the aluminosilicate glass containing 2 wt % of copper oxide which was a transition metal oxide, stable convex-shaped texture processing could be also carried out by controlling a laser power similarly in the case of using the soda lime silicate glass.

As described above, convex-shaped protruded portions each having a stable shape were formed, and the glass substrate using them as texture was washed and then could be provided as a glass substrate with texture for a magnetic disk.

Example 3

Soda lime silicate glass plates having compositions (wt %) shown in Table 5 were prepared by the floating method. The glass plates were subjected to inner and outer diameter processing by using a diamond wheel cutter to obtain disk-shaped glass substrates. By lapping and then polishing the main surfaces of the glass substrates, smooth glass disk substrates each having a predetermined plate thickness were obtained. The glass disk substrates were chemically reinforced and then washed. The outer diameter of each disk was made 65 mm, the inner diameter thereof was made 20 mm, and the plate thickness thereof was made 0.635 mm.

TABLE 5

| Sample No. | 41 | 42 | 43 | 44 | 45 | 46 | 47 | 48 | 49 |
|---|---|---|---|---|---|---|---|---|---|
| Silicon oxide | 71.00 | 72.50 | 71.00 | 72.20 | 71.10 | 71.05 | 72.10 | 72.05 | 71.20 |
| Aluminum oxide | 1.50 | 1.85 | 1.55 | 2.00 | 1.45 | 1.45 | 2.00 | 0.10 | 1.70 |
| Iron oxide | 0.20 | 0.20 | 0.35 | 0.35 | 0.45 | 0.20 | 0.25 | 1.05 | 0.95 |
| Titanium oxide | 0.05 | 0.05 | 0.0 | 0.10 | 0.0 | 0.0 | 0.05 | 0.25 | 0.05 |
| Magnesium oxide | 3.90 | 3.75 | 3.75 | 4.05 | 4.05 | 3.90 | 4.00 | 3.75 | 3.55 |
| Calcium oxide | 8.90 | 7.35 | 8.85 | 8.05 | 8.60 | 8.90 | 6.75 | 8.15 | 7.70 |
| Sodium oxide | 13.40 | 13.25 | 13.25 | 12.30 | 13.35 | 13.40 | 13.60 | 13.95 | 13.50 |
| Potassium oxide | 0.80 | 0.85 | 1.00 | 0.80 | 0.80 | 0.80 | 1.00 | 0.05 | 0.50 |
| Sulfur oxide (Impurity) | 0.25 | 0.20 | 0.25 | 0.15 | 0.20 | 0.30 | 0.25 | 0.10 | 0.10 |
| Cerium oside | — | — | — | — | — | — | — | 0.55 | 0.85 |

The glass disk substrates were subjected to texture processing under the same conditions as in Example 1. As a result, all of the glass disk substrates contained 0.2 wt % in total of the transition metal oxides so that stable texture processing could be carried out by controlling a laser power. These glass compositions have been widely used as a glass for a car and the glasses can be produced in a large-scale float furnace. Therefore, the glasses are preferential to a glass having a special composition from a viewpoint of cost.

As described above, the glass disk substrates on which convex-shaped protruded portions having a stable shape were formed to be used as texture is washed and then can be provided as a glass substrate with texture for a magnetic disk.

In Examples 1 to 3 described above, the YAG pulsed laser was used as a laser beam source, and the laser beam was converted to a light having a wavelength at 266 nm which was quarter the original wavelength by the SHG element and the FHG element. However, a laser beam having a wavelength in a range of ultraviolet rays may be irradiated as a matter of course.

Example 4

Glass slabs each having a glass composition (100 wt % including iron oxide) in which 0.17 wt %, 0.5 wt % or 0.9 wt % of iron oxide ($Fe_2O_3$) was incorporated into an aluminosilicate glass having a composition (wt %) shown in Table 6 were prepared. After these slabs were processed to be formed into a plate shape, the plates were sliced and polished to prepare glass pieces each having a square shape with a size of 30×30 mm and a thickness of 2 mm. The resulting glass substrates were immersed within a molten salt of a mixed salt of potassium nitrate and sodium nitrate (mixing ratio: 60:40) to effect a chemical reinforcing treatment. After the chemical reinforcing treatment, the glass substrates were washed with pure water by scrubbing and dried with hot air.

TABLE 6

| Glass composition | |
|---|---|
| Component | wt % |
| $SiO_2$ | 63.3 |
| $Al_2O_3$ | 16.3 |
| $LiO_2$ | 3.7 |
| $Na_2O$ | 10.6 |
| MgO | 1.9 |
| CaO | 3.8 |

With respect to variation in the heights of the protruded portions forming texture, the optimum conditions and the worst conditions were determined as shown in Table 7 from data obtained by setting 2 to 3 level conditions based on a standpoint of quality engineering. That is, with respect to a $Na_2O$ composition, about ±1 wt % of $Na_3O$ was changed. Further, a processing pitch and a radius pitch refer to intervals in a circumferential direction and intervals in a radius direction when protruded portions are formed in a concentric manner, respectively, and these pitches were changed. A focusing position was changed by a relative position when a position at which a focus seemed to be adjusted was defined as 0. With respect to a reinforcing temperature, the melting temperature of the above mixed salt was changed. Among these changes, a combination of the changes giving the smallest variation in the heights of the protruded portions was defined as the optimum conditions, and a combination of the changes giving the largest variation therein was defined as the worst conditions. The time of reinforcement was made 90 minutes at 400° C. and 30 minutes at 360° C.

TABLE 7

| Output power of laser beam | Optimum conditions | | | Worst conditions | | |
|---|---|---|---|---|---|---|
| | 60 | 80 | 105 | 60 | 80 | 105 |
| Na$_2$O composition (wt %) | 9.6 | 9.6 | 9.6 | 11.6 | 11.6 | 11.6 |
| Processing pitch ($\mu$m) | 15 | 15 | 50 | 100 | 100 | 15 |
| Radius pitch ($\mu$m) | 15 | 100 | 100 | 50 | 15 | 50 |
| Focusing position ($\mu$m) | −50 | −50 | 0 | 50 | 50 | 50 |
| Reinforcing temperature (°C.) | 400 | 360 | 400 | 360 | 400 | 360 |

Next, the absorption coefficients with respect to a wavelength of a light at 266 nm of glass substrates having the respective contents of iron oxide when iron oxide is incorporated in the glass composition of Table 6 are shown in Table 8.

TABLE 8

| Content (wt %) of iron oxide (Fe$_2$O$_3$) | Absorption coefficient of glass × 10$^{-3}$ ($\mu$m$^{-1}$) |
|---|---|
| 0.062 | 11.7 |
| 0.100 | 18.4 |
| 0.260 | 46.7 |
| 0.300 | 52.3 |
| 0.520 | 88.0 |
| 0.600 | 103.2 |
| 0.780 | 134.5 |
| 0.900 | 154.1 |

When the content of iron oxide is 3 wt %, the absorption coefficient of such a glass will be 510 mm$^{-1}$.

From Table 8, it can be seen that the glasses having predetermined contents of iron oxide in Example 4 have absorption coefficients of 0.03 $\mu$m$^{-1}$ or more which is a limit for forming texture and also have absorption coefficients of 2 $\mu$m$^{-1}$ or lower which is an upper limit therefor. From the data in Table 8, a relation between the absorption coefficient of the glass and the content of iron oxide was determined by the following approximate equation. Absorption coefficient ($\mu$m$^{-1}$)=0.17×content of iron oxide (wt %)+0.0014 It can be seen that when the content of iron oxide which becomes a limit for forming texture is calculated by this equation, such a content is 0.17 wt %.

Next, the above substrates were subjected to texture processing by using the same laser used in Example 1. The repeated frequency of a laser beam was made 3 kHz, and a spot diameter was made 10 $\mu$m. The heights of the protruded portions after irradiation of the laser beam were observed and measured by using a differential interference microscope and an interference type surface shape-measuring device (ZYGO). The relation of the height of the protruded portions with the respective output powers of the laser beam and the respective contents of iron oxide is shown in Table 9. For measurement of the output power of the laser beam, 1825-C (883 UV) manufacured by Newport Co. was used. The same device was also used for measuring the output powers of the laser beam in the following Examples.

TABLE 9

| | Output power of laser beam (mW) | | | | | |
|---|---|---|---|---|---|---|
| | 60 | | 80 | | 105 | |
| | Content of iron oxide (wt %) | Height of protruded portions (nm) | Content of iron oxide (wt %) | Height of protruded portions (nm) | Content of iron oxide (wt %) | Height of protruded portions (nm) |
| Optimum conditions | 0.0 | 0.0 | 0.0 | 0.0 | 0.0 | 0.0 |
| | 0.5 | 254.1 | 0.17 | 190.4 | 0.17 | 208.2 |
| | 0.9 | 327.2 | 0.5 | 467.4 | — | — |
| Worst conditions | 0.0 | 0.0 | 0.0 | 0.0 | 0.0 | 0.0 |
| | 0.5 | 196.2 | 0.17 | 74.7 | 0.17 | 204.1 |
| | 0.9 | 303.0 | 0.5 | 513.1 | — | — |

The results in Table 9 are shown by graphs in FIG. 8 to FIG. 10. The respective points in FIG. 8 to FIG. 10 each show a representative value of one group of the data. In each graph, two lines under the optimum conditions and the worst conditions can be drawn. From the graphs, it can be seen that as the output power of the laser beam is larger, a difference between the two lines is smaller, and influence on variation in the height of the protruded portions due to turbulence of the laser beam is smaller. From the graph of FIG. 9, it can be seen that under a suitable output power of the laser beam, as the content of iron oxide is larger, influence on variation in the heights of the protruded portions is smaller.

Next, the inclinations of the respective graphs are determined, and relations between the average inclination values under the optimum conditions and the worst conditions and the output power of the laser beam are shown in FIG. 11.

From FIG. 11, it can be seen that the relations between the inclinations of the graphs and the output power of the laser beam are relations of a natural logarithm. That is, the relations are expressed by the following equations:
under the optimum conditions,
Inclination c=1526×ln[output power (mW) of laser beam−5845],
under the worst conditions,
Inclination c=1482×ln[output power (mW) of laser beam−5626].

From these results, a relationship among the height (nm) of the protruded portions, the content (wt %) of iron oxide and the output power (mW) of the laser beam expressed by the following equation is deduced:
Height of protruded portions
=inclination c×content of iron oxide
=[a×ln(output power of laser beam)−d]×of content of iron oxide
where b=exp (d/a).

This relationship can be also applied to an oxide of a transition metal other than iron oxide.

Further, the above relationship is expressed as shown below from the relationship between the absorption coefficient of the glass and the content of iron oxide. Height of protruded portions=a×(absorption coefficient of glass−e)×ln (output power of laser beam/b)

For example, when the transition metal oxide is iron oxide, a is 23200, b is 45.9, and e is 0.0014.

Accroding to this relationship, by measuring the absorption coefficient of the glass and the height of the protruded protions under conditions of two levels of output powers of the laser beam, the height of the protruded portions with other output power of the laser beam can be determined easily.

From the above relationship, the range of the output power of the laser beam is expressed as shown below.
b×exp[height of protruded portions/(a×content of iron oxide)]>output power of laser beam>b Here, in the case where a is 3950, b is 45.4 to 45.9, the height of the protruded portions is 100 nm and the content of iron oxide is 0.2 wt %, the range of the output power of the laser beam is expressed as shown below. 51.5 to 52.0>output power of laser beam>45.4 to 45.9 (mW)

The above range of the output power of the laser beam may vary depending on the composition of the glass and the reincorcement conditions of the glass.

Next, to confirm the appropriateness of the above relationship, texture was formed by irradiation of a laser beam by using an iron oxide-containing glass different from the above glass. The conditions and results are shown in Table 10.

TABLE 10

| Output power of laser beam | Height of protruded portions (nm) Content of iron oxide (wt %) | |
|---|---|---|
| (mW) | 0.4 | 0.6 |
| 46.2 | 27.0 | 12.9 |
| 51.0 | 173.9 | 257.6 |

The coefficients a and b were determined so that the height of the protruded portions with a lawer beam output power being 46.2 mW shown in Table 10 corresponded to a measured value, and by using the determined coefficients, the height of the protruded portions with a laser beam output power being 51.0 mW was calculated by the above relationship. The results are shown in Table 11.

TABLE 11

| | Content of iron (wt %) | | | |
|---|---|---|---|---|
| | 0.6 | | 0.4 | |
| | Height of protruded portions (nm) | | | |
| | Measured value | Calculated value | Measured value | Calculated value |
| Output power of laser beam (mW) | | | | |
| 46.2 | 12.9 | 12.8 | 27.0 | 26.9 |
| 51.0 | 257.6 | 246.5 | 173.9 | 182.7 |
| Coefficient a | | 2950 | | 3950 |
| Coefficient b | | 45.9 | | 45.4 |

As shown in Table 11, the calculated values of the heights of the protruded portions with a laser beam output power being 51.0 mW quite coincided with the measured values. Therefore, it was proved that the height of the protruded portions can be calculated by the above equation.

Example 5

Glass slabs each having a glass composition (100 wt % including cupric oxide) in which 1.0 wt % or 2.0 wt % of cupric oxide was incorporated into an aluminosilicate glass having a composition (wt %) shown in Table 6 were prepared. After these slabs were processed to be formed into a plate shape, the plates were sliced and polished to prepare glass pieces each having a square shape with a size of 30×30 mm and a thickness of 2 mm. The resulting glass substrates were immersed (at a temperature of 380° C. for 1 hour) within a molten salt of a mixed salt of potassium nitrate and sodium nitrate (mixing ratio: 60:40) to effect a chemical reinforcing treatment. After the chemical reinforcing treatment, the glass substrates were washed with pure water by scrubbing and dried with hot air. A relation between the contents of cupric oxide in the glasses and the absorption coefficients of the glasses is shown in Table 12.

TABLE 12

| Content of cupric oxide (wt %) | Absorption coefficient of glass (× $10^{-3}$ $\mu m^{-1}$) |
|---|---|
| 1.0 | 34.9 |
| 2.0 | 64.6 |

From the results in Table 12, based on the method of least square, the absorption coefficient of the glass and the content of cupric oxide has the following relationship Absorption coefficient of glass=0.0323×content of cupric oxide+0.872× $10^{-3}$ where the unit of the absorption coefficient of the glass is $\mu m^{-1}$, and the unit of the content of cupric oxide is wt %.

Next, the above substrates were subjected to texture processing by using the same laser used in Example 1. The repeated frequency of a laser beam was made 7.93 to 10.1 kHz, and the output power of fourth harmonic was adjusted by changing the repeated frequency. A relation between the repeated frequency and the output power is shown in Table 13. A spot diameter was made about 10 $\mu m$. Both of a processing pitch and a radius pitch were made 30 $\mu m$, and the substrates were processed in a lattice state. The heights of the protruded portions after irradiation of the laser beam were observed and measured by using a differential interference microscope and an interference type surface shape-measuring device (ZYGO). Relations between the respective output powers of the laser beam and the heights of the protruded portions when the contents of cupric oxide of the glasses were 2.0 wt % are shown in Table 14.

When the content of cupric oxide was 1.0 wt %), no swelled protruded portion could be formed.

TABLE 13

| Repeated frequency (kHz) | 7.93 | 8.56 | 9.24 | 10.1 | 11.1 |
|---|---|---|---|---|---|
| Output power of laser beam (mW) | 60 | 55 | 50 | 45 | 40 |

TABLE 14

| Output power of laser beam (mW) | Height of protruded portions (nm) |
|---|---|
| 50 | 50.4 |
| 55 | 142 |
| 60 | 249 |

As described above, even when cupric oxide was used as an oxide of a transition metal, texture formed by protruded portions could be formed.

Next, the relationship obtained in Example 4 is applied to the results of Example 5 to obtain a relation shown in Table 15. However, the absorption coefficient of each glass is 64.59, the coefficient a is 2931, and the coefficient b is 47.7.

TABLE 15

| Output power of laser beam (mW) | Height of protruded portions (nm) | |
|---|---|---|
| | Calculated value | Measured value |
| 50 | 50.4 | 50.4 |
| 55 | 154.2 | 142 |
| 60 | 249.0 | 249 |

As shown in Table 15, it can be seen that the relationship of Example 4 is also applicable to the case of using cupric oxide.

The range of the output power of the laser beam is expressed by the following same equation as in Example 4. b×exp[height of protruded portions/(a×content of cupric oxide)]>output power of laser beam>b Here, when a is 2931, b is 47.7, the height of the protruded portions is 100 nm and the content of cupric oxide is 0.2 wt %, the range of the output power of the laser beam is as shown below.

56.5>output power of laser beam>47.7 (mW)

Example 6

A glass slab having a glass composition (100 wt % including titanium oxide ($TiO_2$)) in which 1.0 wt % of titanium oxide was incorporated into an aluminosilicate glass having a composition (wt %) shown in Table 6 of Example 4 was prepared. Texture was formed in the same manner as in Example 4.

It was confirmed that the relationship of the height of the protruded portions, the absorption coefficient of the glass and the output power of the laser beam can be also applied to Example 6.

That is, from the results of Examples 4 and 5, when the value of the coefficient b is 45.4 to 47.7, the absorption coefficient is $17.5\times10^{-3}$ ($\mu m^{-1}$), the output power of the laser beam is 75 (mW) and the height of the protrusions is 90.2 (nm), the coefficient a is calculated from the following equation.

Coefficient a=height of protruded protions/[absorption coefficient×ln(output power of laser beam/coefficient b)]

Based on this equation, the coefficient a is 9.7 to 11.4. In this case, when the conditions of chemical reinforcement are the same as in Example 4, the coefficient b is 45.68, and the coefficient a in that case is 10.94.

Example 7

A colorant-containing soda lime silicate glass having a composition (wt %) shown in Table 16 was prepared by the floating method. The resulting glass substrate was lapped and polished to obtain a glass substrate for a magnetic disk having a disk thickness of 0.635 nm. The substrate had an outer diameter of 65 mm and an inner diameter of 20 mm. This substrate was chemically reinforced and then subjected to precision washing.

TABLE 16

| Compositional component | wt % |
|---|---|
| $SiO_2$ | 70.3 |
| $Al_2O_3$ | 1.5 |
| MgO | 3.6 |
| CaO | 8.9 |
| $Na_2O$ | 13.3 |
| $K_2O$ | 1.0 |
| $Fe_2O_3$ | 1.3 |
| CoO | 0.02 |
| NiO | 0.03 |
| $TiO_2$ | 0.02 |

Next, the substrate was subjected to texture processing by using the laser texture device used in Example 1. The output power of a laser beam was controlled by using an optical attenuator so that the height of the texture became 20 nm. At that time, the diameter of the condensed laser beam was about 10 $\mu$m, and the diameter of the texture was 3 $\mu$m. After the texture was formed, a subbing film, a magnetic film and a protective film were formed. The protective film was a carbon film containing 20 wt % of silicon and had a film thickness of 16 nm. On the surface of the protective film, a lubricating oil was coated. As the lubricating oil, AM2001 (trade name, available from Montedison Co.) was used, and the thickness thereof was 2.3 nm. After the lubricating oil was coated, the substrate was calcined to heighten a bonding force between the lubricating oil and the surface of the protective film.

The thus prepared medium substrate was subjected to a CCS test by using a head having a load of 3.5 gf. The rotation number of the substrate was 4500 rpm, and a kick-off time was made 3 seconds and a down time 4 seconds. Every 1000 times of CSS, a static friction coefficient ($\mu S$) and a dynamic friction coefficient ($\mu f$) between the head and the texture, and a fluctuation width ($\Delta\mu$) of the dynamic friction coefficient were measured. The rotation number of the substrate at the time of measurement was made 1 rpm. The average logarithms of square values of data measured every 1000 times of CSS were calculated, and values obtained by multiplying the logarithms by −10 were defined as SN ratios of the respective friction coefficients to give such an index that when the value of the friction coefficient is small and dispersion is small, the value of SN ratio is enlarged. Such an index value was determined with respect to the static friction coefficient, the dynamic friction coefficient and the fluctuation width of the dynamic friction coefficient, and conditions under which the sum of these values was the largest were determined. The results are shown in FIG. 12.

SN ratio=−10 log(($\Sigma\mu s^2$)*($\Sigma\mu f^2$)*($\Sigma\Delta\mu^2$)/$n^3$) (dB)

Figure 13:
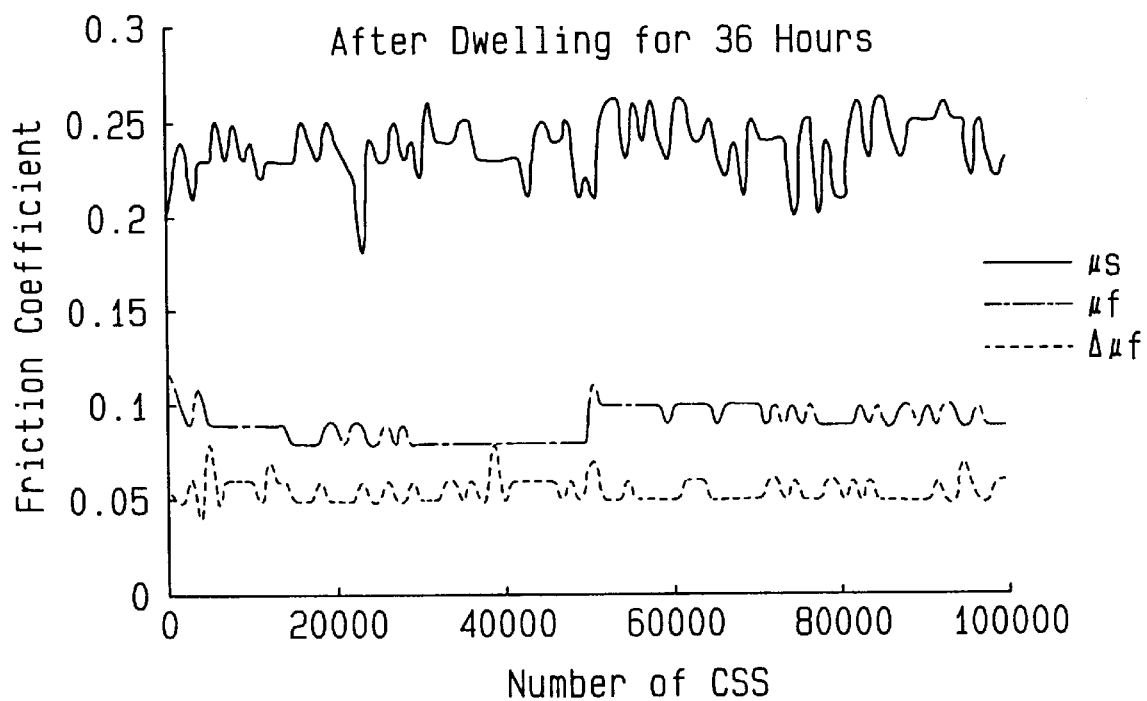
FIG. 13 is a graph showing a friction coefficient characteristic under CSS optimum conditions.

As shown in FIG. 12, it can be seen that when the size of a texture pitch is 18.7 $\mu$m, the SN ratio is the largest. Further, under these conditions, no abnormality was found at the protective film or others even after applying CSS for 100,000 times. No increase in the static friction coefficient was recognized. A graph showing a relation between the number of CSS and the static friction coefficient is shown in FIG. 13.

If a texture density in a CSS zone is too low, each texture cannot stand a load from the head applied thereon so that the protective film is abraded. On the other hand, if the texture density is too high, an effective contact area of the texture and the head becomes large to enlarge the static friction coefficient after the head is stopped on the texture. In that sense, the optimum texture density exists. The value of the optimum texture density may vary depending on the height and diameter of the texture, but in the texture of the present invention, it is optimum that the texture density is about 2300 to 2700 mm$^{-2}$, particularly about 2500 mm$^{-2}$.

Therefore, the present examples and embodiment are to be considered as illustrative and not restrictive and the invention isnot to be limited to the details given herein, but may be modified within the scope and equivalence of the appended claims.

What is claimed is:

1. A glass substrate for a magnetic disk in which a laser beam is irradiated on a main surface thereby forming a large number of protrusions thereon to form texture thereon, each of said protrusions being formed by a protruded portion having a convex shape, said glass having a composition in which 0.2 to 3 wt % of an oxide of a transition metal is contained and an absorption coefficient with respect to a wavelength of a light at 266 nm being within a range of 0.03 to 2 $\mu$m$^{-1}$, said glass substrate being an aluminosilicate glass formed from a floating glass method, wherein the oxide of a transition metal is at least one oxide selected from the group consisting of titanium oxide, vanadium oxide, chromium oxide, manganese oxide, iron oxide, cobalt oxide, nickel oxide, copper oxide, molybdenum oxide, tungsten oxide and cerium oxide.

2. A glass substrate for a magnetic disk in which a laser beam is irradiated on a main surface thereby forming a large number of protrusions thereon to form texture thereon, each of said protrusions being formed by a protruded portion having a convex shape, said glass having a composition in which 0.2 to 3 wt % of an oxide of a transition metal is contained and an absorption coefficient with respect to a wavelength of a light at 266 nm being within a range of 0.03 to 2 $\mu$m$^{-1}$, said glass substrate being an aluminosilicate glass formed from a floating glass method, wherein the glass has a composition by weight of silicon oxide (SiO$_2$): 70 to 74%,
aluminum oxide (Al$_2$O$_3$): 0 to 2.5%,
iron oxide (Fe$_2$O$_3$): 0.1 to 1.2%,
titanium oxide (TiO$_2$): 0 to 0.3%,
magnesium oxide (MgO): 3.0 to 4.5%,
calcium oxide (CaO): 6.5 to 9.5%,
sodium oxide (Na$_2$O): 12 to 14%,
potassium oxide (K$_2$): 0 to 1.2%, and
cerium oxide (CeO$_2$): 0 to 1%, provided that the total amount of FeO, TiO and CeO is 0.2% or more.

3. A glass substrate for a magnetic disk in which a laser beam is irradiated on a main surface thereby forming a large number of protrusions thereon to form texture thereon, each of said protrusions being formed by a protruded portion having a convex shape, said glass having a composition in which 0.2 to 3 wt % of an oxide of a transition metal is contained and an absorption coefficient with respect to a wavelength of a light at 266 nm being within a range of 0.03 to 2 $\mu$m$^{-1}$, said glass substrate being an aluminosilicate glass formed from a floating glass method, wherein the glass is chemically reinforced.

4. A glass substrate for a magnetic disk in which a laser beam is irradiated on a main surface thereby forming a large number of protrusions thereon to form texture thereon, each of said protrusions being formed by a protruded portion having a convex shape, said glass having a composition in which 0.2 to 3 wt % of an oxide of a transition metal is contained and an absorption coefficient with respect to a wavelength of a light at 266 nm being within a range of 0.03 to 2 $\mu$m$^{-1}$, said glass substrate being an aluminosilicate glass formed from a floating glass method, wherein the protruded portions having a convex shape have a spacing of 2 to 50 $\mu$m, a diameter of 1 to 10 $\mu$m and a height of 10 to 50 nm.

5. A glass substrate for a magnetic disk in which a laser beam is irradiated on a main surface thereby forming a large number of protrusions thereon to form texture thereon, each of said protrusions being formed by a protruded portion having a convex shape, said glass having a composition in which 0.2 to 3 wt % of an oxide of a transition metal is contained and an absorption coefficient with respect to a wavelength of a light at 266 nm being within a range of 0.03 to 2 $\mu$m$^{-1}$, said glass substrate being an aluminosilicate glass formed from a floating glass method, wherein the protruded portions having a convex shape are formed only on predetermined areas.

6. A glass substrate according to claim 1, wherein the oxide of a transition metal is at least one oxide selected from the group consisting of iron oxide, copper oxide, titanium oxide, cerium oxide, cobalt oxide and nickel oxide.

7. A glass substrate according to claim 6, wherein the oxide of a transition metal is at least one oxide selected from the group consisting of iron oxide, copper oxide, titanium oxide and cerium oxide.

8. A glass substrate according to claim 1, wherein the height of the protruded portions has a relation with the content of the oxide of a transition metal in the glass and the output power of the laser beam, which is expressed by the following relationship:

Height of protruded portions=a×content of oxide of transition metal×1n(output power of laser beam/b)

where a and b each represent a coefficient, the unit of the height of the protruded portions is nm, the unit of the content of the oxide of a transition metal is wt %, in represents a natural logarithm, and the unit of the output power of the laser beam is mW.

9. A glass substrate according to claim 1, wherein the height of the protruded portions has a relation with the absorption coefficient of the glass and the output power of the laser beam, which is expressed by the following relationship:

Height of protruded portions=a×(absorption coefficient of glass−e)×1n(output power of laser beam/b)

where a, b and e each represent a coefficient, the unit of the height of the protruded portions is nm, the unit of the absorption coefficient of the glass is $\mu$m$^{-1}$, in represents a natural logarithm, and the unit of the output power of the laser beam is mW.

10. A glass substrate for a magnetic disk in which a laser beam is irradiated on a main surface thereby forming a large number of protrusions thereon to form texture thereon, each of said protrusions being formed by a protruded portion having a convex shape, said glass substrate being an aluminosilicate glass formed from a floating glass method, said glass having a composition in which 0.2 to 3 wt % of an oxide of a transition metal is contained and an absorption coefficient with respect to a wavelength of a light at 266 nm being within a range of 0.03 to 2 $\mu$m$^{-1}$ and a composition by weight of silicon oxide (SiO$_2$): 58 to 66%,
aluminum oxide (Al$_2$O$_3$): 13 to 19%,
lithium oxide (Li$_2$O): 3 to 4.5%, sodium oxide (Na$_2$)): 6 to 13%, potassium oxide (K$_2$)): 3 to 4.5%, R$_2$O: 10 to 18% (provided that R$_2$O=Li$_2$O+Na$_2$)+K$_2$O), magnesium oxide (MgO): 0 to 3.5%, calcium oxide (CaO): 1 to 7%, strontium oxide (SrO): 0 to 2%, barium oxide (BaO): 0 to 2%, RO: 2 to 10% (provided that RO=MgO+CaO+SrO+BaO), and iron oxide (Fe$_2$O$_3$): 0.05 to 2%.

11. A glass substrate according to claim 10, wherein the height of the protruded portions has a relation with the content of the oxide of a transition metal in the glass and the output power of the laser beam, which is expressed by the following relationship:

Height of protruded portions=a×content of oxide of transition metal×ln(output power of laser beam/b)

where a and b each represent a coefficient, the unit of the height of the protruded portions is nm, the unit of the content of the oxide of a transition metal is wt %, ln represents a natural logarithm, and the unit of the output power of the laser beam is mW.

12. A glass substrate according to claim 10, wherein the height of the protruded portions has a relation with the absorption coefficient of the glass and the output power of the laser beam, which is expressed by the following relationship:

Height of protruded portions=a×(absorption coefficient of glass−e)×ln(output power of laser beam/b)

where a, b and e each represent a coefficient, the unit of the height of the protruded portions is nm, the unit of the absorption coefficient of the glass is $\mu$m$^{-1}$, ln represents a natural logarithm, and the unit of the output power of the laser beam is mW.

* * * * *

UNITED STATES PATENT AND TRADEMARK OFFICE
CERTIFICATE OF CORRECTION

PATENT NO. : 6,132,843

DATED : October 17, 2000

INVENTOR(S) : Kuroda et al.

It is certified that error appears in the above-identified patent and that said Letters Patent is hereby corrected as shown below:

> The assignee on the cover page of the patent is incorrect.
> Delete "Do.," and insert -- Co., --

Signed and Sealed this

Eighth Day of May, 2001

*Attest:*

NICHOLAS P. GODICI

*Attesting Officer*     *Acting Director of the United States Patent and Trademark Office*